United States Patent
Mandler

(10) Patent No.: US 10,061,142 B2
(45) Date of Patent: Aug. 28, 2018

(54) WORKPIECE WITH OPTICAL LENS BLANK, METHOD FOR THE PRODUCTION THEREOF, AND METHOD FOR THE MACHINING THEREOF

(71) Applicant: OptoTech Optikmaschinen GmbH, Wettenberg (DE)

(72) Inventor: Roland Mandler, Heuchelheim (DE)

(73) Assignee: OptoTech Optikmaschinen GmbH, Wettenberg (DE)

( * ) Notice: Subject to any disclaimer, the term of this patent is extended or adjusted under 35 U.S.C. 154(b) by 0 days.

(21) Appl. No.: 15/376,991

(22) Filed: Dec. 13, 2016

(65) Prior Publication Data

US 2017/0168317 A1 Jun. 15, 2017

(30) Foreign Application Priority Data

Dec. 14, 2015 (DE) .......................... 10 2015 121 682

(51) Int. Cl.
| | |
|---|---|
| *B24B 13/00* | (2006.01) |
| *G02C 7/02* | (2006.01) |
| *B24B 13/005* | (2006.01) |

(52) U.S. Cl.
CPC .............. *G02C 7/022* (2013.01); *B24B 13/00* (2013.01); *B24B 13/005* (2013.01); *B24B 13/0057* (2013.01)

(58) Field of Classification Search
CPC .. G02C 7/00; G02C 7/02; G02C 7/022; B24B 11/00; B24B 13/00; B24B 13/005; B24B 13/0052; B24B 13/0055; B24B 13/0057
USPC ........................ 351/159.57; 264/1.1; 451/384
See application file for complete search history.

(56) References Cited

U.S. PATENT DOCUMENTS

| | | | | |
|---|---|---|---|---|
| 3,962,833 A | * | 6/1976 | Johnson ................ | B24B 13/005 428/40.6 |
| 4,707,208 A | * | 11/1987 | Crumbach .............. | B29C 51/16 156/285 |
| 5,763,075 A | * | 6/1998 | Benjamin ........... | B24B 13/0052 428/349 |

(Continued)

FOREIGN PATENT DOCUMENTS

| | | |
|---|---|---|
| DE | 20116824 U1 | 3/2002 |
| DE | 10353553 A1 | 6/2005 |

(Continued)

OTHER PUBLICATIONS

German Office Action for German Patent No. 102015121682.5 dated Nov. 18, 2016, 8 pages.

(Continued)

*Primary Examiner* — William R Alexander
(74) *Attorney, Agent, or Firm* — TraskBritt

(57) ABSTRACT

A workpiece has an optical lens blank with a first lens face and a second lens face, which are arranged opposite each other and are delimited at a lens circumference, and a cover film on the first lens face, wherein a first recess in the lens blank is formed, which is open in the direction of the first lens face and which is at least partially spanned in the direction of the first lens face by the cover film. A method for the production thereof and a method for the machining thereof. The machining method is distinguished, in particular, by the cover film being gripped for the purpose of pulling it off in the area that spans the first recess.

20 Claims, 3 Drawing Sheets

(56) References Cited

U.S. PATENT DOCUMENTS

| | | | | |
|---|---|---|---|---|
| 5,808,721 | A * | 9/1998 | Wood | B29D 11/0073 351/159.01 |
| 5,885,700 | A * | 3/1999 | Weldon | B24B 13/0057 351/159.02 |
| 6,074,290 | A * | 6/2000 | Ko | B24B 13/0057 451/255 |
| 6,250,512 | B1 * | 6/2001 | Salamon | G02B 1/105 222/394 |
| 6,319,433 | B1 * | 11/2001 | Kohan | B29D 11/0073 156/275.5 |
| 7,121,931 | B2 * | 10/2006 | Katzman | B23B 31/4073 451/42 |
| 7,813,059 | B2 * | 10/2010 | Asai | B24B 9/14 264/1.32 |
| 7,935,402 | B2 * | 5/2011 | Cole | B24B 9/146 428/317.3 |
| 2003/0183240 | A1 * | 10/2003 | Manougian | A45D 33/006 132/295 |
| 2004/0166784 | A1 * | 8/2004 | Katzman | B23B 31/4073 451/42 |
| 2004/0222537 | A1 * | 11/2004 | Sidhu | B29D 11/0073 264/1.31 |
| 2010/0170627 | A1 * | 7/2010 | Hamanaka | B24B 13/005 156/154 |
| 2011/0124272 | A1 * | 5/2011 | Felten | B24B 13/0057 451/42 |
| 2015/0217420 | A1 * | 8/2015 | Mandler | B23Q 3/088 29/559 |
| 2015/0273646 | A1 * | 10/2015 | Castro | B29D 11/00942 29/557 |
| 2015/0309217 | A1 * | 10/2015 | Castro | B29D 11/00942 29/458 |

FOREIGN PATENT DOCUMENTS

| | | |
|---|---|---|
| DE | 102010010334 A1 | 9/2011 |
| EP | 2145730 A1 | 1/2010 |

OTHER PUBLICATIONS

European Search Report for European Application No. 16198822 dated May 16, 2017, 5 pages.

* cited by examiner

WORKPIECE WITH OPTICAL LENS BLANK, METHOD FOR THE PRODUCTION THEREOF, AND METHOD FOR THE MACHINING THEREOF

PRIORITY CLAIM

This application claims the benefit of the filing date of German Patent Application Serial No. DE 10 2015 121 682.5, filed Dec. 14, 2015, for "Workpiece With Optical Lens Blank, Method for the Production Thereof, and Method for the Machining Thereof."

TECHNICAL FIELD

The disclosure relates to a workpiece with an optical lens blank, to a method for the production thereof, and to a method for the machining of such a workpiece.

BACKGROUND

Eyeglasses, in particular, are produced from optical lens blanks. Although individual optical surfaces have to be produced in order to correct visual defects of persons, the manufacture is one of mass production. Only in this way can the eyeglasses be produced cost-effectively. Since the production of lenses is traditionally a skill and always requires a high level of flexibility in order to produce the necessary optical surfaces, the state of the art includes numerous machines for performing individual work steps in an automated manner, for example, milling machines, turning machines, polishing machines and coating machines. However, manual work steps are still carried out between these automated work steps.

One of these work steps involves pulling off protective films, which are applied to a first lens face of an optical lens blank, while the second lens face is being machined. Here, protruding edges disrupt the machining, which is why adhesive bonding across the whole surface is used in most cases. To pull off the film, a worker uses a sharp tool to lift up the cover film and then pull it off. However, this is time-consuming and also causes scratches on the surface of the lens blank. This increases the number of rejects.

BRIEF SUMMARY

The object of the disclosure is, therefore, to make available a workpiece and a method by which a machined lens face is effectively protected during further work steps and, in particular, permits a high degree of automation in the execution of the work steps. The solution should be easy to implement and should be cost-effective.

The main features of the disclosure are in the characterizing part of Claim 1 and also Claims 10 and 11. Embodiments form the subject matter of Claims 2 to 9 and 12.

The disclosure relates to a workpiece having an optical lens blank with a first lens face and a second lens face, which are arranged opposite each other and are delimited at a lens circumference, and a cover film on the first lens face. A first recess in the lens blank is formed, which is open in the direction of the first lens face and which is at least partially spanned in the direction of the first lens face by the cover film.

An advantage of such an embodiment is that the cover film, in the area spanning the first recess, can be easily gripped and then pulled off from the lens blank. In this way, the first lens face is protected from damage until the cover film is pulled off. In particular, the first lens face can thus have an optically effective surface. The fact that the recess is spanned also means that this area of the cover film does not flutter uncontrollably upon rapid rotation of the optical lens blank in a machining tool. Noises and vibrations caused by fluttering are avoided. Moreover, an optionally self-adhesive cover film in the area of the recess is prevented from adhering to anything via the exposed portion and thus accidentally being pulled off. Through the positioning of the recess on the optical lens, the position of the portion of the cover film to be gripped is also known in many machining tools, since the rotation angle position is a crucial item of information for the production of asymmetrical eyeglasses. Therefore, the gripping portion, which always lies at a known and defined location and spans the recess, can also be easily gripped using automated grippers.

In a more specific embodiment of the workpiece, provision is made that the first recess is open in the direction of the lens circumference. Thus, for the purpose of gripping the cover film, the recess can be accessed from the direction of the lens circumference. If the first recess is not open in the direction of the lens circumference, then, depending on the embodiment of the first recess, there are still the options of accessing the recess from the direction of the first lens face, optionally with piercing of the cover film, and of accessing the recess from the direction of the second lens face, in order to at least lift the cover film and then grip it.

In a particular embodiment of the workpiece, the first recess is open over the corner, which is formed by the first lens face and by the lens circumference. In this way, a gripping tool can be moved without any problem into the gripping position and, with the cover film gripped, can move away from the optical lens blank.

According to a further optional design, the first recess is open in the direction of the second lens face. It is thus possible to access the recess from the direction of the second lens face. Moreover, such a recess would be suitable for allowing a cover film on the second lens face to be easily pulled away too. Preferably, the first recess is open over the corner, which is formed by the second lens face and by the lens circumference.

Furthermore, an optional design is possible in which the first recess is a groove. A groove is easy to produce and provides a good access opening for the purpose of pulling off the cover film. Preferably, the groove extends on the lens circumference from the first lens face to the second lens face. The groove is preferably longer than it is wide and/or wider than it is deep and/or longer than it is deep. This results in a groove that can be easily accessed, that can be spanned effectively by the cover film, while at the same time, however, the available area for a lens to be produced decreases only slightly. To avoid peak stresses in the material of the lens blank, a groove with a rounded or round groove base is advantageously provided.

In a particular embodiment, at least a second recess is also arranged over the lens circumference, which second recess is at least partially spanned in the direction of the first lens face by the cover film. The center of gravity of the lens can thus lie at the center of the lens blank. In this way, an imbalance is avoided. Moreover, the cover film can be gripped the same way at several locations and pulled off. This is particularly advantageous if coverage of a recess is damaged during the machining or is destroyed during the gripping maneuver.

With regard to the embodiment of the second recess, there is the option that the second recess is open in the direction of the lens circumference. A further option is that the second recess is open over the corner that is formed by the first lens face and by the lens circumference. The second recess can be open in the direction of the second lens face. It is moreover conceivable that the second recess is open over the corner that is formed by the second lens face and by the lens circumference. Moreover, it is particularly advantageous if the second recess is a groove. The above-described advantages concerning the first recess accordingly apply to the respective design options concerning the second recess. The recesses are preferably of identical configuration. It has proven especially practical to have three or four recesses arranged over the lens circumference.

Moreover, in one variant, provision is made that the cover film, except where it spans the recesses, lies completely on the first lens face. Accordingly, the cover film does not have a troublesome protrusion that could flutter about uncontrollably. In other words, the cover film does not extend beyond the lens circumference, except where it spans the recesses. Noises and vibrations caused by fluttering are avoided.

In a particular embodiment of the workpiece, the cover film, except where it spans the recesses, is connected completely to the first lens face, in particular, adhesively bonded thereto. This results in a stable union, which allows greater forces to be applied. This is advantageous, particularly when holding the workpiece on the cover film.

With regard to the detailed embodiment of the optical lens blank, the options are that the first lens face is concave or convex. Moreover, the second lens face can be concave or convex independently thereof. From the possible combinations of features, many different optical lenses can be produced. The lens circumference preferably has a basic circular shape.

With regard to the cover film, it is particularly preferable if the latter is adhesively bonded to the lens face. Adhesive bonding is easy to carry out. For this purpose, a self-adhesive cover film is preferably used. This is particularly easy to apply.

For the machining of the workpiece, a specific embodiment of particular advantage is one in which the optical lens blank and the cover film are blocked on a holding piece. The lens blank, blocked in this way, can be easily and securely clamped in various machining tools and worked. The holding piece should be arranged on the side of the first lens face relative to the optical lens blank. The cover film can form a separation layer between the optical lens blank and the holding piece and preferably permits a complete separation between the optical lens blank and the holding piece. The first lens face is thus protected by the cover film from aggressive media of the blocking agent.

The disclosure moreover relates to a method for the production of a workpiece as described above and in the following, which method involves making available an optical lens blank with a first lens face and a second lens face, which are arranged opposite each other and are delimited at the lens circumference. The first lens face is then machined by cutting, grinding, polishing and/or surface treatment, and a first recess is cut in the lens blank, which recess is open in the direction of the first lens face. Thereafter, a cover film is applied to the first lens face, in particular, by adhesive bonding, with which the first recess is at least partially spanned in the direction of the first lens face.

The already machined first lens face is thus protected with the aid of the cover film during the further machining of the lens. The first recess allows the cover film to be easily pulled off. The special additional features of the workpiece can thus also be implemented individually in accordance with the method. The advantages described in this connection can thus each be achieved. The cover film is preferably applied to the first lens face in an automated manner.

In a special variant of the method, the optical lens blank and the cover film are blocked on a holding piece, wherein the cover film is arranged between the lens blank and the holding piece. The second lens face can thus be machined with the workpiece being simply clamped on the holding piece.

The disclosure moreover relates to a method for the machining of a workpiece as described above and below or to a workpiece produced by the method described above, which method first comprises machining the second lens face by cutting, grinding, polishing and/or surface treatment. The cover film is then gripped in a gripping area, in which the cover film spans the first recess, and the cover film is pulled off from the first lens face by pulling at the gripped gripping area. By virtue of the defined and exposed area of the cover film, the pulling off of the cover film is particularly easy, and the risk of damaging the already machined lens faces is low. The method is, therefore, particularly suitable for producing lenses or eyeglasses with free-form surfaces machined on both sides. The advantage of machining both sides lies in the high degree of flexibility of the lens configuration and in the very small number of rough lenses needed for being able to produce all standard eyeglasses.

In a special method variant, the workpiece is secured in a machining tool, and the cover film is gripped at the gripping area and pulled off using an automated gripper. It is thus possible to achieve a high level of automated production since no manual intermediate steps are necessary for releasing the cover film. This accordingly leads to low production costs per lens.

During the pulling-off process, the workpiece is particularly preferably held by negative pressure being applied to the second lens face. If a holding piece is provided, the cover film should be pulled off only after the holding piece has been unblocked. Both measures are suitable for removing the film in an automated manner and without damaging the machined lens faces.

BRIEF DESCRIPTION OF THE DRAWINGS

Further features, details and advantages of the disclosure will become clear from the wording of the claims and from the following description of illustrative embodiments with reference to the drawings, in which:

DETAILED DESCRIPTION

Figure 1:
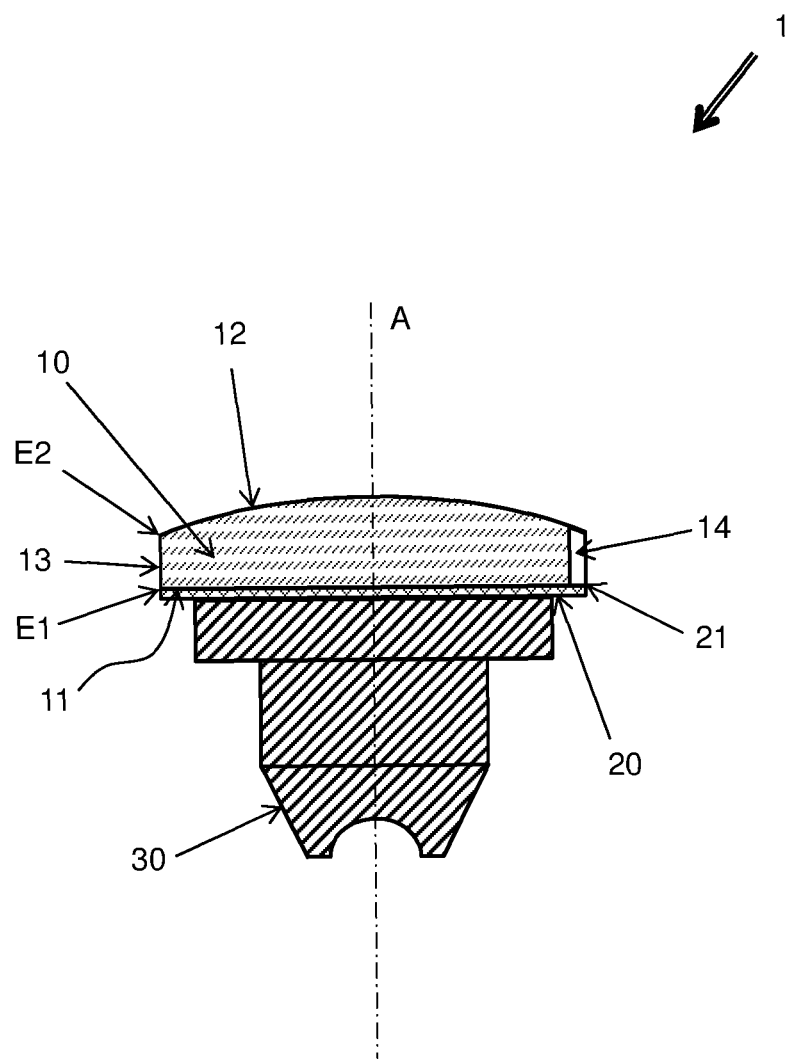
FIG. 1 shows a schematic section through a workpiece.

FIG. 1 shows a workpiece 1, which has an optical lens blank 10, a cover film 20 and a holding piece 30. These are jointly rotatable about a depicted rotation axis A.

The optical lens blank 10 has a first lens face 11 and a second lens face 12, which are arranged opposite each other and are delimited at a lens circumference 13. The lens circumference 13 has a basic circular shape. The optical lens blank 10 shown optionally has a disc-shaped configuration, in particular, in which the first lens face 11 is planar and the second lens face 12 is convex.

Arranged in the lens blank 10 is a first recess 14, which is open in the direction of the first lens face 11, in the direction of the second lens face 12 and in the direction of the lens circumference 13. In particular, the first recess 14 is also open over the corner E1, which is formed by the first lens face 11 and by the lens circumference 13. The same applies to the second corner E2. The first recess 14 is also open over this second corner E2, which is formed by the second lens face 12 and by the lens circumference 13. In this way, the first recess 14 has a groove shape. This groove extends on the lens circumference 13 from the first lens face 11 to the second lens face 12. The groove is longer than it is deep.

It will be seen that the cover film 20 lies on the first lens face 11. The cover film 20 spans the first recess 14 at least partially in the direction of the first lens face 11. The cover film 20, except where it spans the recesses 14, lies completely on the first lens face 11 and does not extend beyond the lens circumference 13. Preferably, the cover film 20, except where it spans the recesses 14, is connected completely to the first lens face 11, particularly preferably bonded thereto. For the latter option, the cover film 20 can be self-adhesive.

The optical lens blank 10 is blocked on the holding piece 30 via the cover film 20. For this purpose, the holding piece 30 is arranged on the side of the first lens face 11 relative to the optical lens blank 10. The cover film 20 forms a separating layer between the optical lens blank 10 and the holding piece 30, which effects a complete separation between the optical lens blank 10 and the holding piece 30.

Figure 2:
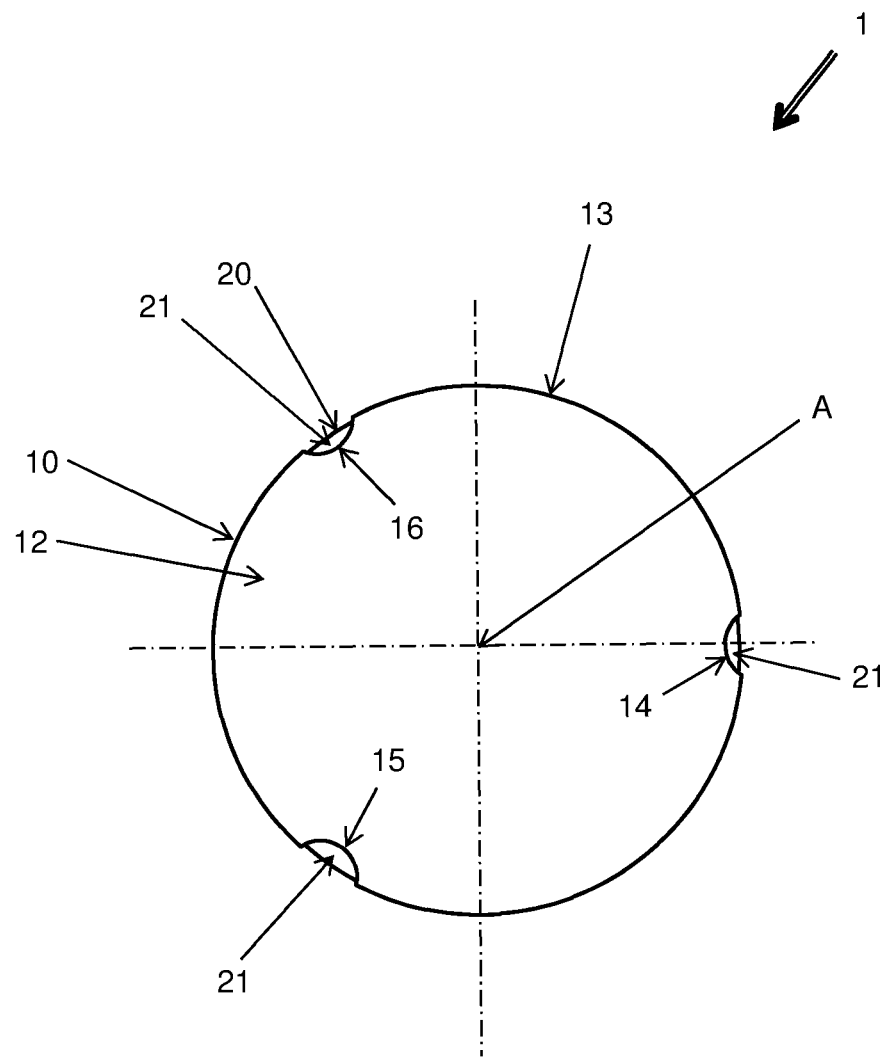
FIG. 2 shows a schematic plan view of a workpiece.

FIG. 2 shows a schematic plan view of a workpiece 1, such as is shown in FIG. 1. In this respect, reference is made to the description of FIG. 1. In brief, FIG. 2 also shows the optical lens blank 10, but in this case, from the direction of the second lens face 12. The rotation axis A runs through the center of the lens blank 10. The figure shows particularly clearly the first recess 14 and how the latter is at least partially spanned by the cover film 20. A gripping area 21 is thereby formed.

It will additionally be noted that a second recess 15 and a third recess 16 are also arranged over the lens circumference 13, which recesses are also each at least partially spanned in the direction of the first lens face 11 by the cover film 20. The second recess 15 and third recess 16 are also open in the direction of the lens circumference 13, in the direction of the first lens face 11 and in the direction of the second lens face 12, in particular, also over the corners that are each formed by one of the first lens face 11 and second lens face 12 and the lens circumference 13. Thus, all three recesses 14, 15, 16 are grooves. These each have in particular a round groove base and are of the same shape. Moreover, the grooves are wider than they are deep.

As a result of the uniform distribution of the recesses 14, 15, 16 over the lens circumference 13, the center of gravity of the optical lens blank 10 lies at its center.

The workpieces shown in FIGS. 1 and 2 can be produced by carrying out at least the following steps:
making available an optical lens blank 10 with a first lens face 11 and a second lens face 12, which are arranged opposite each other and are delimited at a lens circumference 13;
machining the first lens face 11 by cutting, grinding, polishing and/or surface treatment and cutting out the recesses 14, 15, 16 in the lens blank 10, which recesses are open in the direction of the first lens face 11, the second lens face 12 and the lens circumference 13;
applying a cover film 20 to the first lens face 11, with which the recesses 14, 15, 16 are at least partially spanned in the direction of the first lens face 11.

Thereafter, the optical lens blank 10 and the cover film 20 can be jointly blocked on a holding piece 30, with the cover film 20 being arranged between the lens blank 10 and the holding piece 30.

Figure 3:
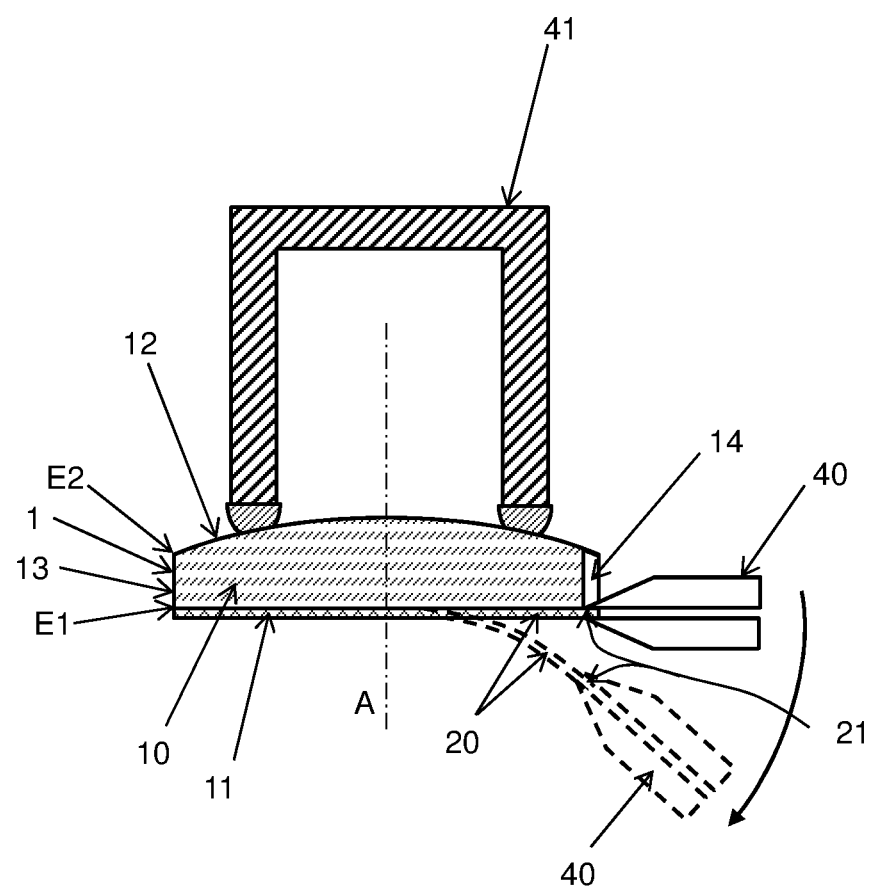
FIG. 3 shows a schematic view of a workpiece, in which a cover film is depicted being pulled off from a first lens face of an optical lens blank.

It will be seen in FIG. 3 how a workpiece 1 is received in a machining tool 41, which has at least the depicted vacuum holder. The workpiece 1 corresponds to the one according to FIG. 1, although the holding piece 30 has already been unblocked.

Moreover, it will be seen how the cover film 20 is gripped at the gripping area 21 by a gripper 40. The dashed lines indicate the cover film 20 being pulled off from the first lens face 11. This depiction of the gripper 40 and of the cover film 20 in dashed lines shows how the gripper 40 moves relative to the optical lens blank 10 and pulls the cover film 20 from the first lens face 11.

The invention is not limited to one of the embodiments described above and instead can be modified in many ways.

All of the features and advantages evident from the claims, the description and the drawings, including design details, spatial arrangements and method steps, may be essential to the invention, both individually and also in a wide variety of combinations.

What is claimed is:

1. A workpiece having:
an optical lens blank with a first lens face and a second lens face, which are arranged opposite each other and are delimited at a lens circumference; and
a cover film on the first lens face,
wherein a first recess in the lens blank is formed:
which is open in the direction of the first lens face, and
which is at least partially spanned in the direction of the first lens face by the cover film.

2. The workpiece according to claim 1, wherein the first recess is open in the direction of the lens circumference.

3. The workpiece according to claim 2, wherein the first recess is open over a corner, which is formed by the first lens face and by the lens circumference.

4. The workpiece according to claim 1, wherein the first recess is open in the direction of the second lens face.

5. The workpiece according to claim 1, wherein the first recess is a groove.

6. The workpiece according to claim 1, wherein at least a second recess is also open in the direction of the first lens face, and wherein the at least a second recess is at least partially spanned in the direction of the first lens face by the cover film.

7. The workpiece according to claim 6, wherein the cover film, except where it spans the first recess and at least a second recess, lies completely on the first lens face.

8. The workpiece according to claim 6, wherein the cover film, except where it spans the first recess and at least a second recess, is connected completely to the first lens face.

9. The workpiece according to claim 1, wherein the optical lens blank and the cover film are blocked on a holding piece.

10. The workpiece according to claim 6, further comprising at least a third recess open in the direction of the first lens face, wherein the at least a third recess is at least partially spanned in the direction of the first lens face by the cover film.

11. The workpiece according to claim 10, wherein the first recess, at least a second recess, and at least a third recess are uniformly distributed over the lens circumference.

12. The workpiece according to claim 6, wherein the at least a second recess is open in the direction of the second lens face.

13. The workpiece according to claim 1, wherein the first recess has a width and a depth, wherein the width is greater than the depth.

14. A method for production of a workpiece, comprising the following steps:
    providing an optical lens blank with a first lens face and a second lens face, which are arranged opposite each other and are delimited at a lens circumference;
    machining the first lens face by cutting, grinding, polishing and/or surface treatment and cutting a first recess in the lens blank, which first recess is open in the direction of the first lens face; and
    applying a cover film to the first lens face, with which the first recess is at least partially spanned in the direction of the first lens face.

15. The method according to claim 14, further comprising:
    machining the second lens face by cutting, grinding, polishing and/or surface treatment; and
    then gripping the cover film in a gripping area, in which the cover film spans the first recess, and pulling the cover film off from the first lens face by pulling at the gripped gripping area.

16. The method according to claim 15, wherein the workpiece is secured in a machining tool, and the cover film is gripped at the gripping area and pulled off using an automated gripper.

17. The method according to claim 14, wherein applying the cover film to the first lens face comprises applying a self-adhesive cover film to the first lens face.

18. The method according to claim 14, wherein applying the cover film to the first lens face comprises laying the cover film completely on the first lens face except where the cover film spans the first recess.

19. The method according to claim 14, further comprising holding the optical lens blank with a holding piece.

20. The method according to claim 19, further comprising completely separating the optical lens blank from the holding piece with the cover film.

* * * * *